United States Patent
Park

(10) Patent No.: US 12,046,980 B2
(45) Date of Patent: Jul. 23, 2024

(54) INVERTER-INTEGRATED MOTOR APPARATUS

(71) Applicants: Hyundai Motor Company, Seoul (KR); Kia Corporation, Seoul (KR)

(72) Inventor: Hyong Joon Park, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 317 days.

(21) Appl. No.: 17/729,488

(22) Filed: Apr. 26, 2022

(65) Prior Publication Data

US 2023/0059986 A1 Feb. 23, 2023

(30) Foreign Application Priority Data

Aug. 23, 2021 (KR) .................. 10-2021-0110655

(51) Int. Cl.
*H02K 5/20* (2006.01)
*H02K 9/19* (2006.01)
*H02K 11/33* (2016.01)

(52) U.S. Cl.
CPC .............. *H02K 5/203* (2021.01); *H02K 9/19* (2013.01); *H02K 11/33* (2016.01); *H02K 2211/03* (2013.01)

(58) Field of Classification Search
CPC .......... H02K 5/203; H02K 9/19; H02K 11/33; H02K 2211/03
See application file for complete search history.

(56) References Cited

U.S. PATENT DOCUMENTS

| | | | |
|---|---|---|---|
| 10,122,247 B2 * | 11/2018 | Hattori | H02M 7/003 |
| 10,211,698 B2 | 2/2019 | Hanioka et al. | |
| 2005/0168081 A1 * | 8/2005 | Takenaka | H02K 11/33 |
| | | | 310/75 R |
| 2016/0105083 A1 * | 4/2016 | Ishimaru | H02K 5/22 |
| | | | 310/54 |
| 2019/0131847 A1 | 5/2019 | Funk et al. | |
| 2019/0297753 A1 * | 9/2019 | Okuhata | H05K 7/20254 |
| 2020/0352059 A1 * | 11/2020 | Kim | H05K 7/20927 |
| 2023/0402904 A1 * | 12/2023 | Itaya | H02K 11/33 |

FOREIGN PATENT DOCUMENTS

| | | |
|---|---|---|
| JP | 4327618 | 6/2009 |
| JP | 5989515 | 8/2016 |
| KR | 10-2014-0137781 | 12/2014 |
| KR | 10-2019-0069963 | 6/2019 |
| KR | 10-2063726 | 1/2020 |
| KR | 10-2074229 | 2/2020 |

* cited by examiner

Primary Examiner — Jue Zhang
(74) Attorney, Agent, or Firm — MORGAN, LEWIS & BOCKIUS LLP

(57) ABSTRACT

An inverter-integrated motor apparatus employing a simplified structure that connects an inverter assembly into which a power module, a cooling device, and a capacitor are integrally combined and a motor assembly, is configured for securing the cooling performance through water cooling.

12 Claims, 11 Drawing Sheets

INVERTER-INTEGRATED MOTOR APPARATUS

CROSS REFERENCE TO RELATED APPLICATION

The present application claims priority to Korean Patent Application No. 10-2021-0110655, filed Aug. 23, 2021, the entire contents of which is incorporated herein for all purposes by this reference.

BACKGROUND OF THE PRESENT DISCLOSURE

Field of the Present Disclosure

The present disclosure relates to an inverter-integrated motor apparatus employing a simplified structure that connects an inverter assembly into which a power module, a cooling device, and a capacitor are integrally combined and a motor assembly, the invert-integrated motor apparatus being capable of securing the cooling performance through water cooling.

Description of Related Art

Generally, because much heat is generated from an insulated gate bipolar transistor (IGBT) module, it is necessary to manufacture a large-sized semiconductor chip and a large-sized power module package to realize high electric power conversion and high heat dissipation. To this end, a semiconductor chip that ensures less power loss is used to improve the heat dissipation performance, a material having an excellent heat dissipation property is used to facilitate heat dissipation, and a large-sized heat dissipation plate is used.

For the present reason, there has been a demand for developing a miniaturized/high heat dissipation IGBT power module package through development of an inverter package that produces the same output as required by the existing specification and is miniatured to improve the hybrid power control unit (HPCU) system output performance for hybrid electric vehicles (HEV).

Accordingly, a general IGBT power module package employs a single-direction and/or vertical heat dissipation structure.

This structure requires an increase in a size of a heat dissipation material to improve the heat dissipation performance, and the present requirement leads to increasing an entire package size.

Furthermore, an IGBT power module package having a single direction/vertical structure is limited in material size and package size.

Therefore, there has been a demand for developing a miniaturized/high heat dissipation IGBT power module package, which is a new concept, to develop the inverter package that produces normal output and is miniatured and to improve the HPCU system output performance for hybrid electric vehicles (HEV).

An inverter system for hybrid electric vehicles (HEV) is an apparatus that converts high-voltage battery direct current power into three-phase alternating current power to generate motor drive power, provides the resulting power to a drive motor, and control torque of the drive motor. For the present power conversion, a switching circuit is configured using a semiconductor element (an insulated gate bipolar transistor (IGBT)) which is capable of performing high-voltage/high-current control.

To realize a high-voltage/high-current/miniaturized package for the present IGBT module for an HPCU, it is very important to select an IGBT that ensures less power loss and to design a package in which a problem associated with heat dissipation (a heat transfer or heat emission capacity) is alleviated.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an inverter-integrated motor apparatus employing a simplified structure that connects an inverter assembly into which a power module, a cooling device, and a capacitor are integrally combined and a motor assembly, the invert-integrated motor apparatus being configured for securing the cooling performance through water cooling.

According to various aspects of the present disclosure, there is provided an inverter-integrated motor apparatus including: a motor housing configured so that a cooling medium circulates therein; a plurality of main portions mounted in the motor housing and connected to each other in a circumferential direction of the motor housing, electric components being accommodated in the plurality of main portions, respectively; a sub-portion provided between each of the main portions and configured to press against an external flank surface of the main portion adjacent thereto; a cooling device combined with a flank surface of each of the main portions and a flank surface of the sub-portion, the cooling medium in the motor housing being shared with the cooling device and circulating through the cooling device; and a power module positioned between each of the main portions or between the main portion and the sub-portion and interposed between each of the cooling devices.

In the inverter-integrated motor apparatus, in a state where the cooling device and the power module are provided in the main portion and the sub-portion, respectively, the main portion and the sub-portion, when connected to each other, may be positioned so that the external flank surfaces of the main portion and the sub-portion are matched to each other, and thus may form an inverter housing.

In the inverter-integrated motor apparatus, the inverter housing may be mounted on the top portion of the motor housing and may be electrically connected thereto, and a control board and a cover may be mounted on the top portion of the inverter housing.

In the inverter-integrated motor apparatus, a mounting space in which the electric component is accommodated may be formed inside the main portion which is formed at a fan shape or a triangle shape and to which one other main portion or the sub-portion is circularly connected.

In the inverter-integrated motor apparatus, a cooling path along which the cooling medium circulates may be formed in the motor housing, and a recess portion along which the cooling medium on the cooling path circulates when the cooling device is combined may be formed in the flank surfaces of the main portion and the sub-portion.

In the inverter-integrated motor apparatus, an inlet hole through which the cooling medium is introduced and an outlet hole through which the cooling medium is discharged may be formed in the recess portion of each of the main portion and the sub-portion.

In the inverter-integrated motor apparatus, the cooling path may include: an introduction path connected to one of the inlet holes in the main portion or the sub-portion; a connection path connecting the inlet hole in one of the adjacent recess portions and the outlet hole in the other one thereof in the main portion and the sub-par; and a discharge path connected to one of the outlet holes in the main portion or the sub-portion.

In the inverter-integrated motor, guide portions may be formed on the external flank surface of each of the main portions and the external flank surface of the sub-portion, respectively, to extend in a same direction, and when the main portion and the sub-portion are connected to each other, a separation space may be formed between each of the main portions and between the main portion and the sub-portion so that the cooling device and the power module may be provided in the separation space.

In the inverter-integrated motor apparatus, an elastic mechanism that exerts an elastic force in a sideways direction may be provided in the sub-portion.

In the inverter-integrated motor apparatus, the elastic mechanism may include: a pair of variable panels formed to be matched to the flank surface of the main portion and the flank surface of the sub-portion and transformed so that a gap between the pair of variable panels is widened in a sideways direction; and an elastic body connected to the pair of variable panels and configured to exert an elastic force in a direction in which the gap between the pair of variable panels is widened.

In the inverter-integrated motor apparatus, when the power module is not provided between each of the main portions or between the main portion and the sub-portion, a dummy portion having the same shape as the power module may be provided.

The inverter-integrated motor apparatus, configured as described above, employs a simplified structure in which an inverter assembly that a power module, a cooling device, and a capacitor form integrally and a motor assembly are connected to each other and secures the cooling performance through water cooling.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
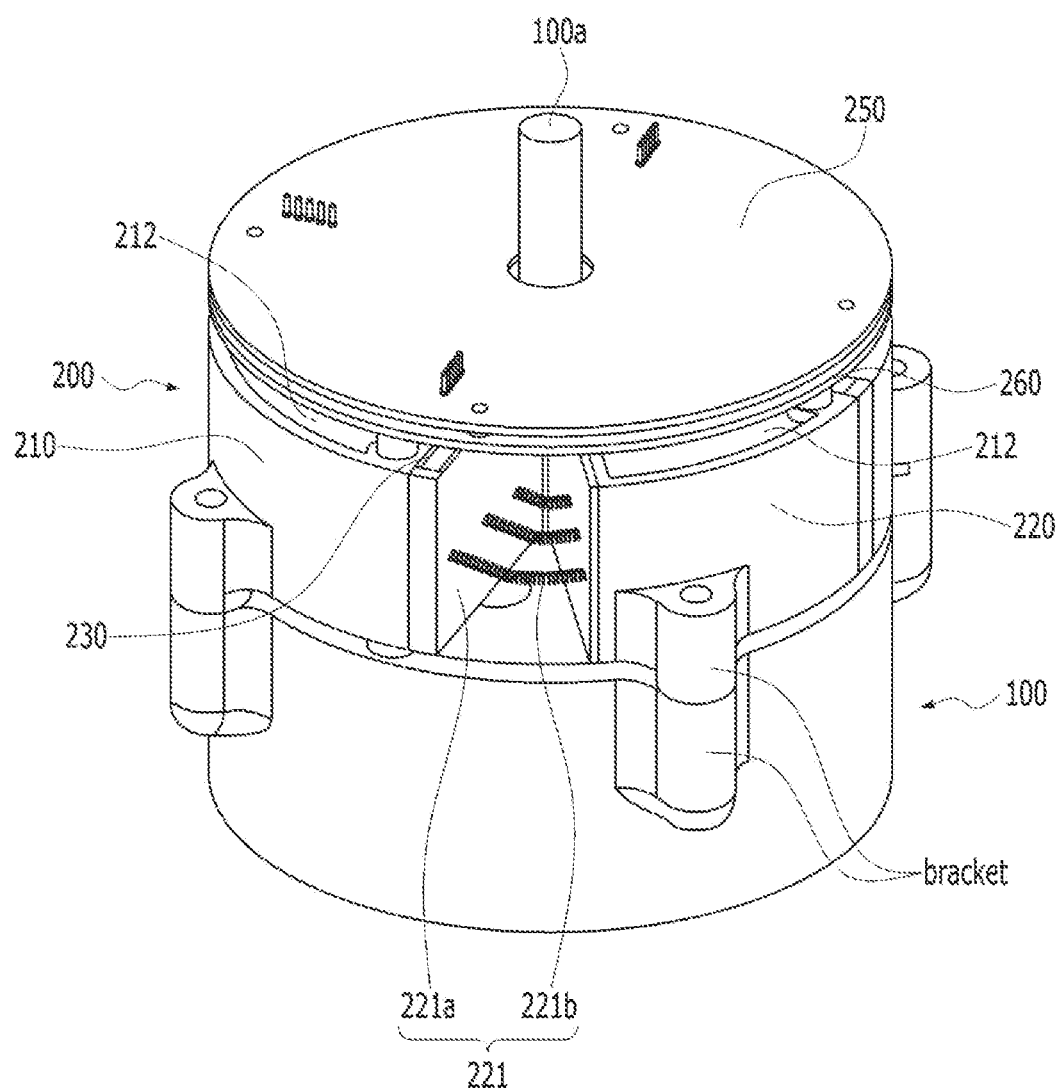
FIG. 1 is a perspective view exemplarily illustrating an inverter-integrated motor apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

An inverter-integrated motor apparatus according to a desired embodiment of the present disclosure will be described below with reference to the accompanying drawings.

Figure 2:
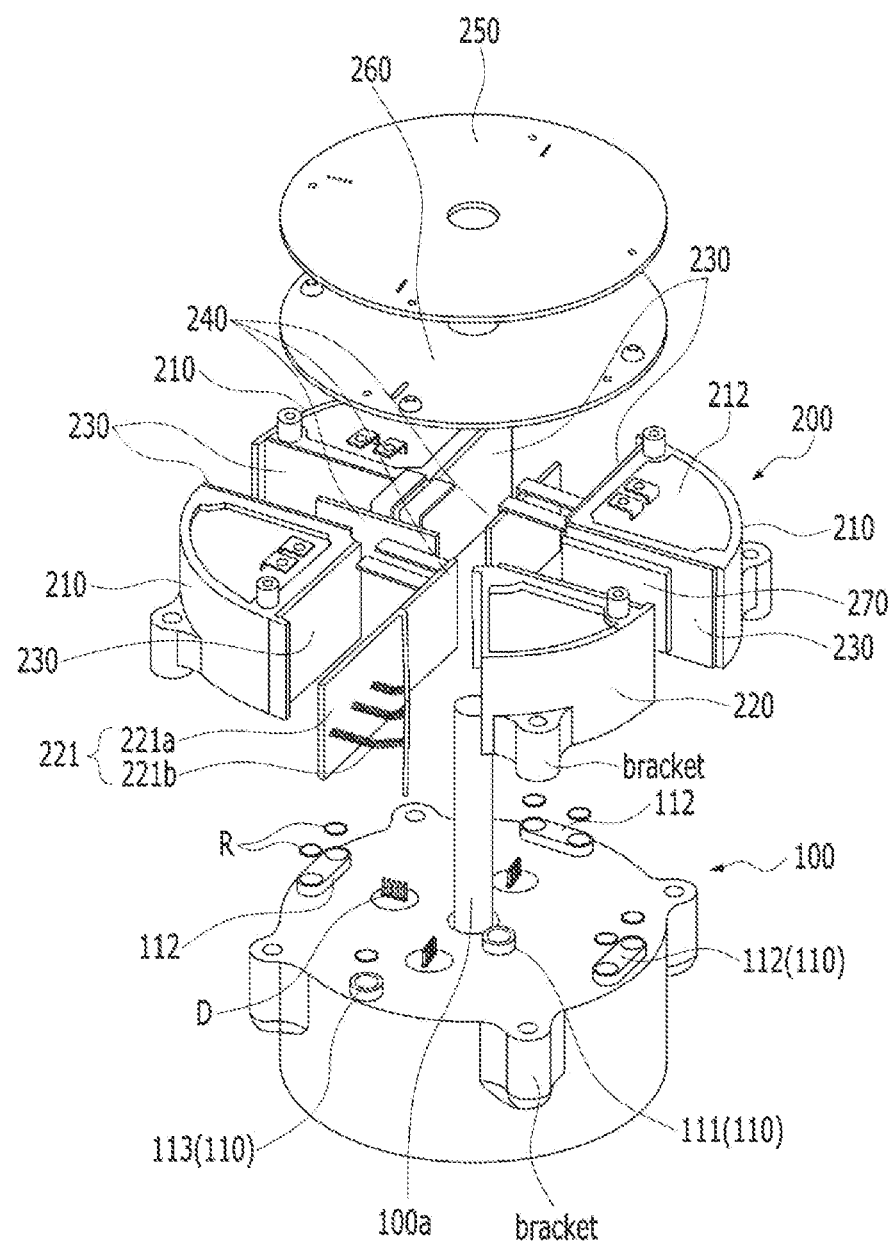
FIG. 2 is an exploded perspective view exemplarily illustrating the inverter-integrated motor apparatus illustrated in FIG. 1.
Figure 3:
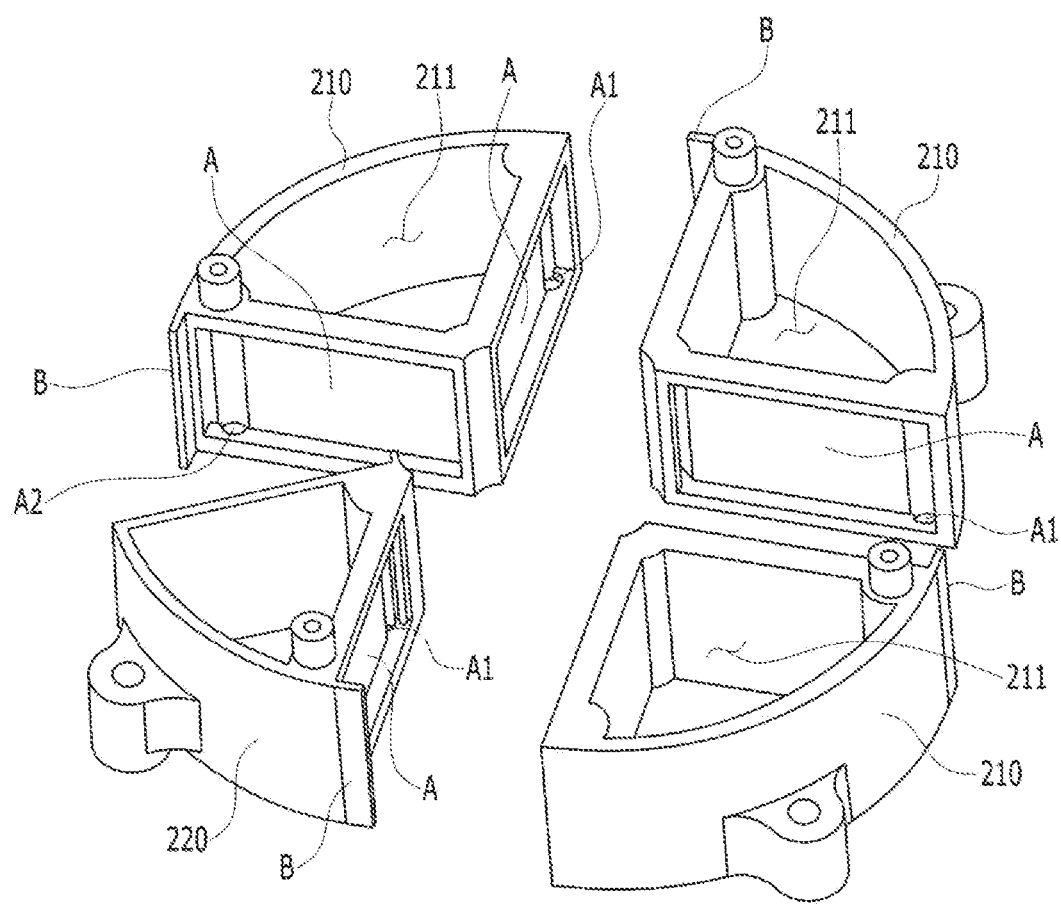
FIG. 3 is a view exemplarily illustrating main portions and a sub-portion of the inverter-integrated motor apparatus illustrated in FIG. 1.

FIG. 1 is a perspective view exemplarily illustrating an inverter-integrated motor apparatus according to an exemplary embodiment of the present disclosure. FIG. 2 is an exploded perspective view exemplarily illustrating the inverter-integrated motor apparatus illustrated in FIG. 1. FIG. 3 is a view exemplarily illustrating a main portion and a sub-portion of the inverter-integrated motor apparatus illustrated in FIG. 1.

Figure 4:
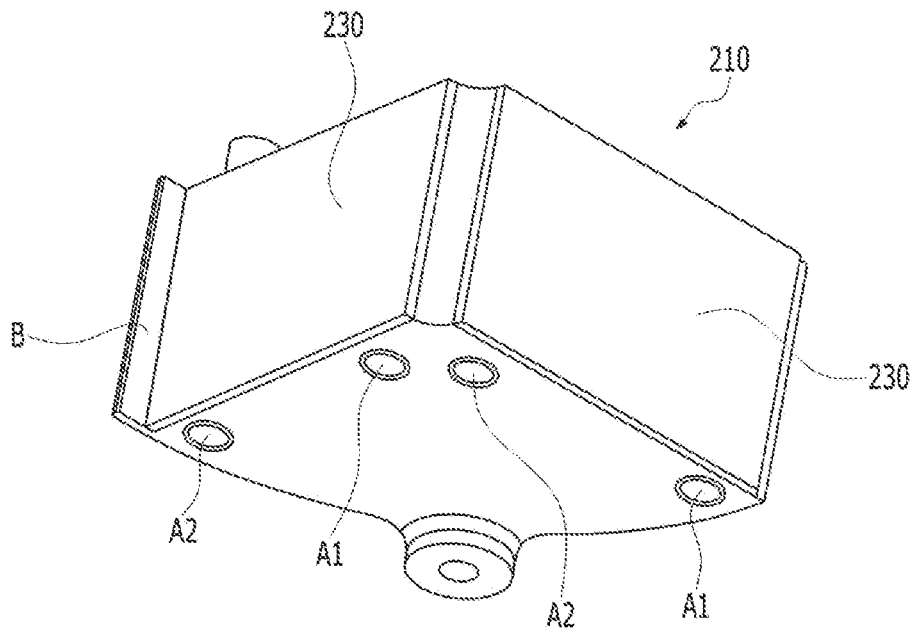
FIG. 4 is a perspective view exemplarily illustrating the main portion.
Figure 5:
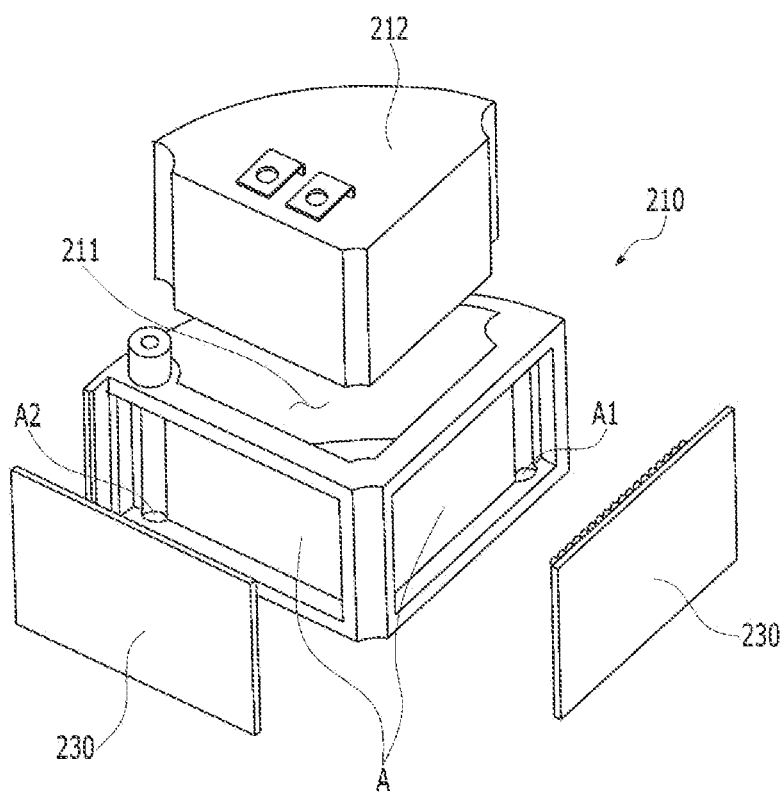
FIG. 5 is an exploded perspective view exemplarily illustrating the main portion.

FIG. 4 is a perspective view exemplarily illustrating the main portion. FIG. 5 is an exploded perspective view exemplarily illustrating the main portion.

Figure 6:
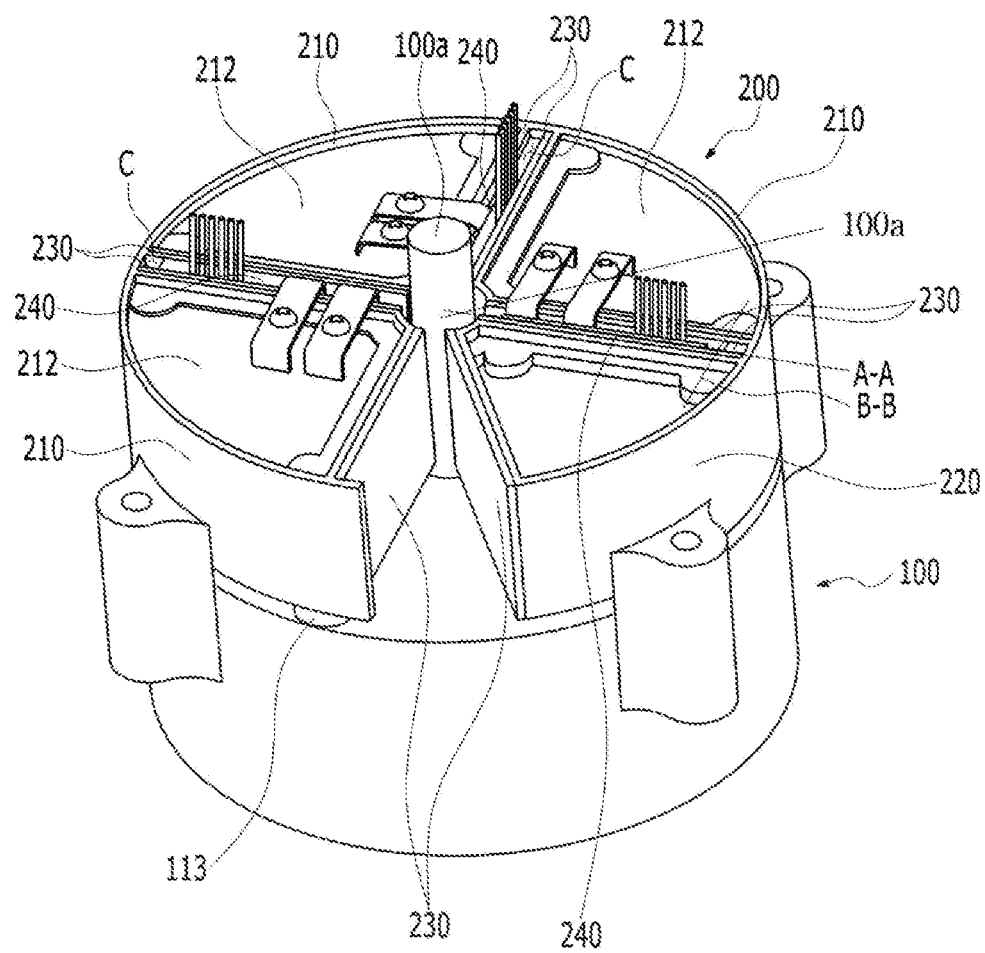
FIG. 6 is a view exemplarily illustrating an inverter housing of the inverter-integrated motor apparatus according to an exemplary embodiment of the present disclosure.

FIG. 6 is a view exemplarily illustrating an inverter housing of the inverter-integrated motor apparatus according to an exemplary embodiment of the present disclosure. FIG.

Figure 8:
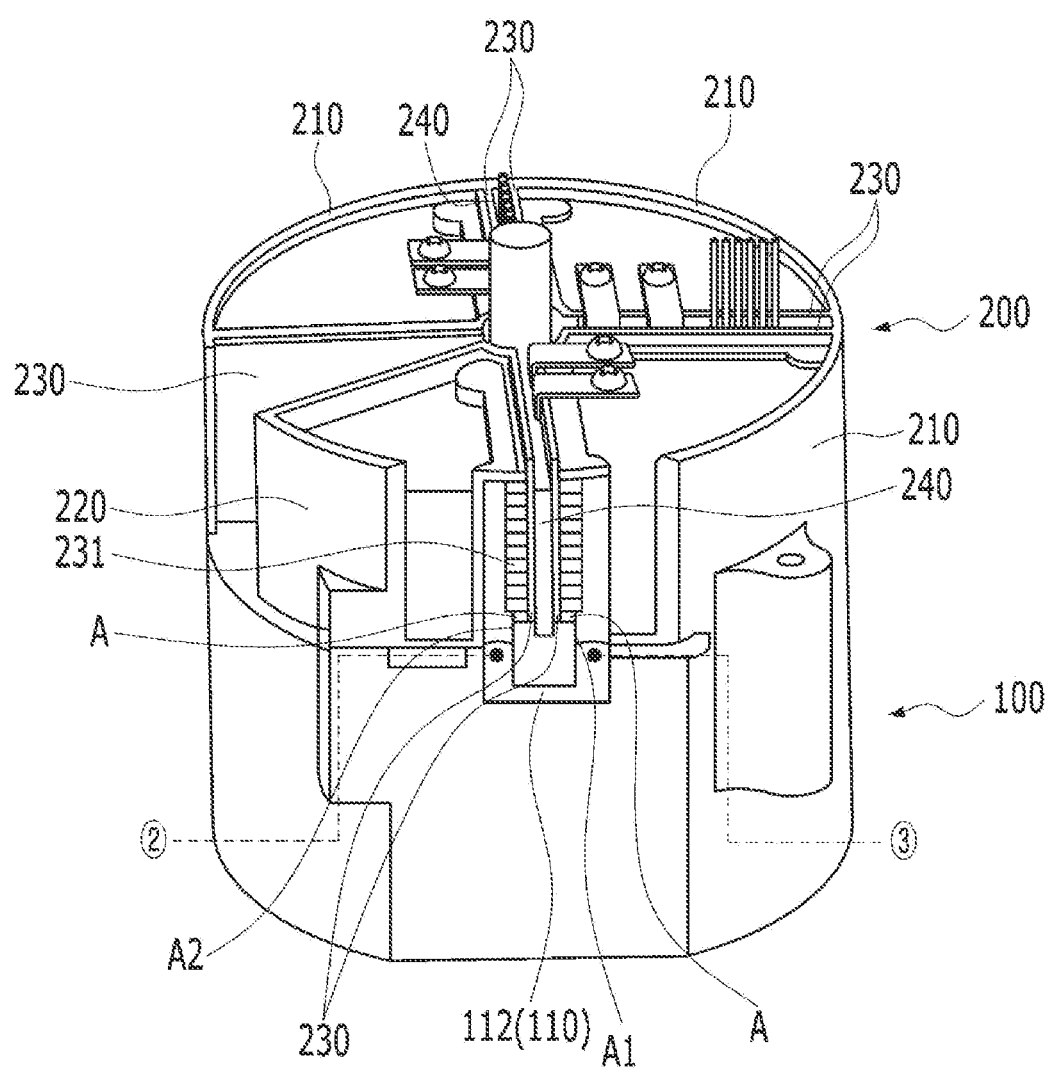
FIG. 8 is a cross-sectional perspective view exemplarily illustrating the inverter housing, taken along line B-B on FIG. 6.
Figure 9:
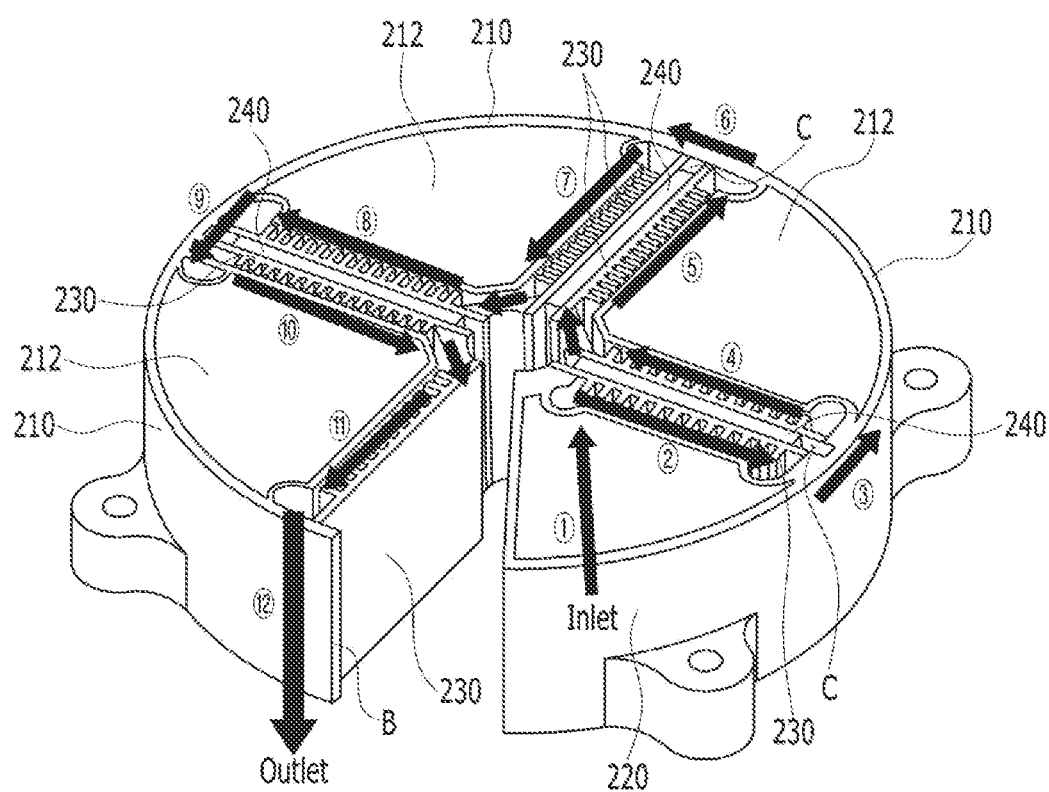
FIG. 9 is a view exemplarily illustrating circulation of a cooling medium through the main portions and the sub-portion.
Figure 10:
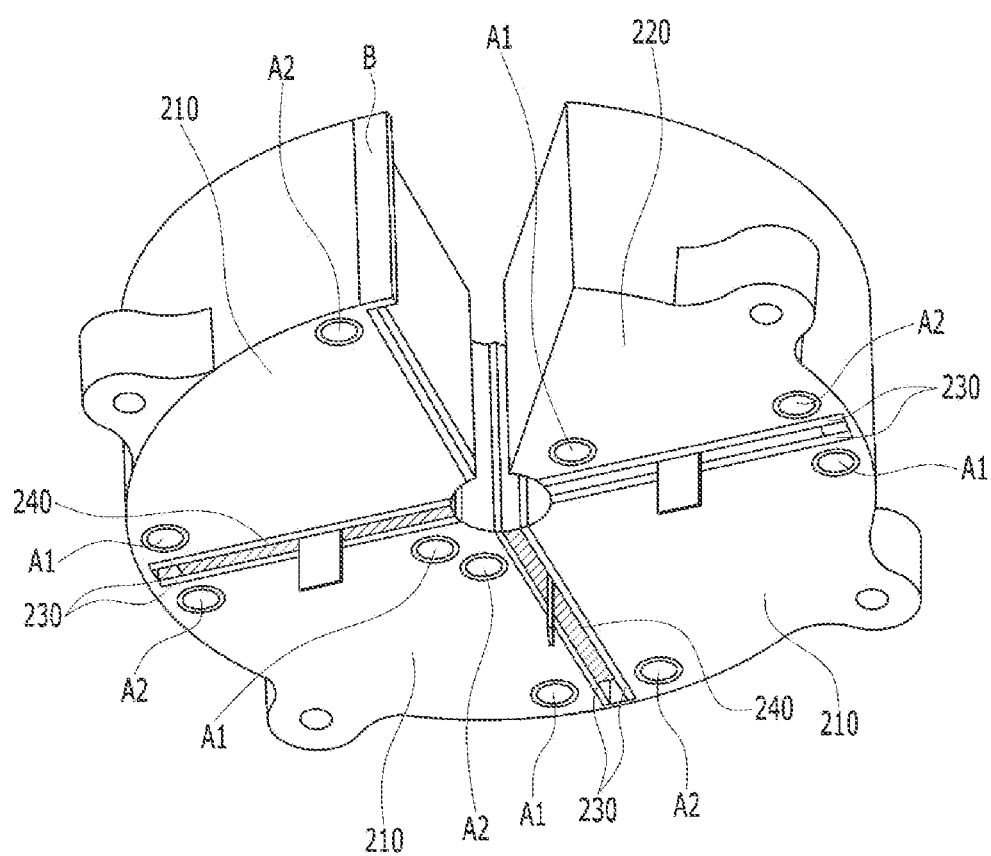
FIG. 10 is a view exemplarily illustrating the circulation of the cooling medium through the main portions and the sub-portion.

7 is a cross-sectional perspective view exemplarily illustrating the inverter housing, taken along line A-A on FIG. 6. FIG. 8 is a cross-sectional perspective view exemplarily illustrating the inverter housing, taken along line B-B on FIG. 6. FIG. 9 is a view exemplarily illustrating circulation of a cooling medium through the main portions and the sub-portion. FIG. 10 is a view exemplarily illustrating the circulation of the cooling medium through the main portions and the sub-portion.

Figure 11:
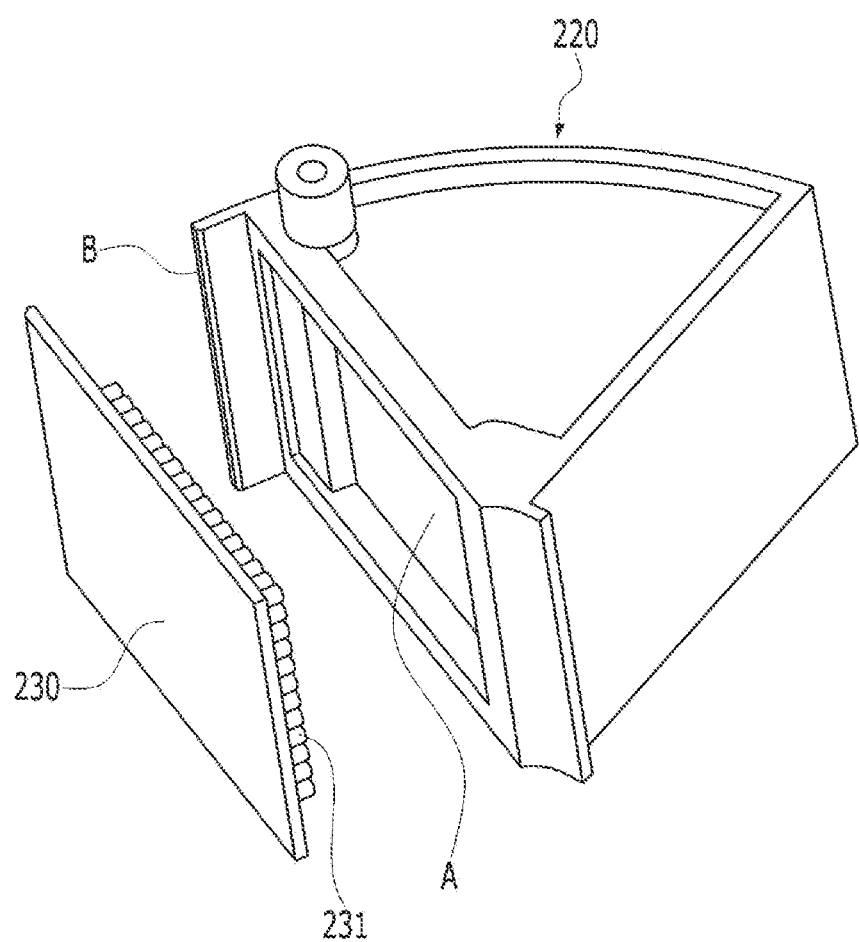
FIG. 11 is an exploded perspective view exemplarily illustrating the sub-portion.
Figure 12:
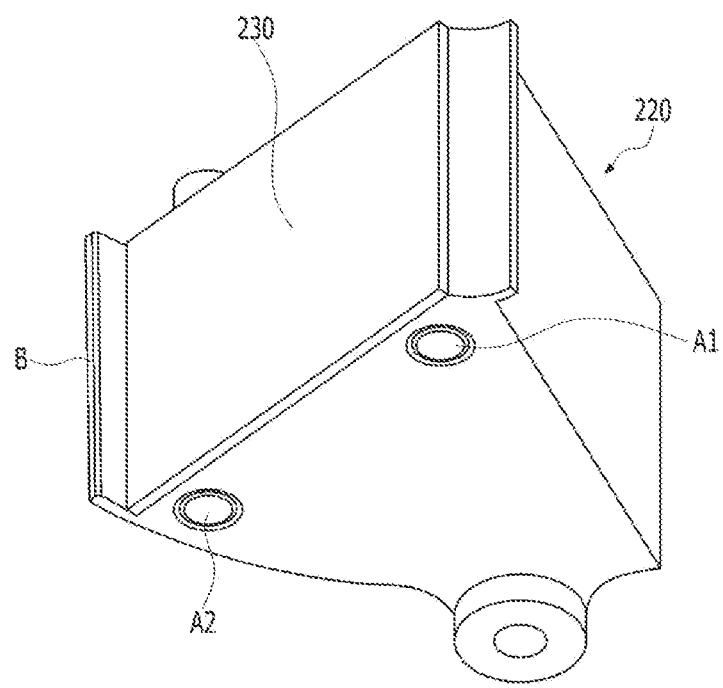
FIG. 12 is a perspective view exemplarily illustrating the sub-portion.
Figure 13:
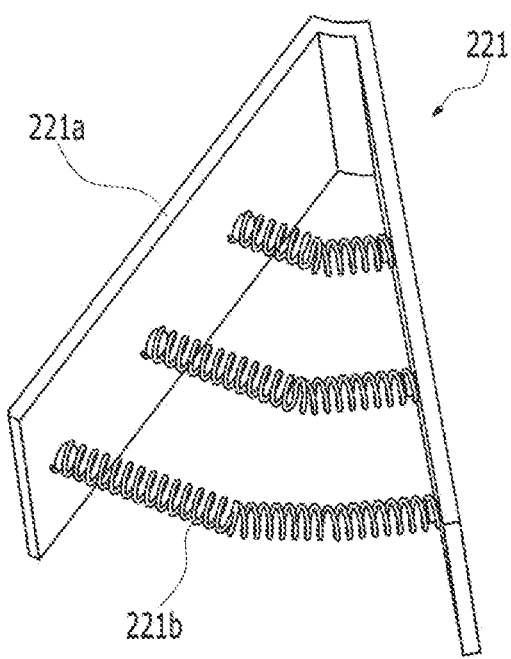
FIG. 13 is a view exemplarily illustrating an elastic mechanism.

FIG. 11 is an exploded perspective view exemplarily illustrating the sub-portion. FIG. 12 is a perspective view exemplarily illustrating the sub-portion. FIG. 13 is a view exemplarily illustrating an elastic mechanism.

The inverter-integrated motor apparatus according to an exemplary embodiment of the present disclosure, as illustrated in FIG. 1 and FIG. 2, includes a motor housing 100, a plurality of main portions 210, a sub-portion 220, a cooling device 230, and a power module 240. The motor housing 100 is configured so that a cooling medium circulates therein. The plurality of main portions 210 are mounted in the motor housing 100. The plurality of main portions 210 are connected to each other in a circumferential direction of the motor housing 100. Electric components 212 are built into the plurality of main portions 210, respectively. The sub-portion 220 is provided between each of the main portions 210. The sub-portion 220 is configured to press against an external flank surface of the main portion 210 adjacent thereto and thus to push the main portion 210 adjacent thereto. The cooling device 230 is combined with a flank surface of each of the main portions 210 and a flank surface of the sub-portion 220. The cooling medium in the motor housing 100 is shared with the cooling device 230 and circulates through the cooling device 230. The power module 240, positioned between each of the main portions 210 or between the main portion 210 and the sub-portion 220, is interposed between each of the cooling devices 230.

In the present configuration, the motor housing 100 includes a rotor, and a rotation shaft 100*a* includes a magnet. Thus, rotation of the rotation shaft 100*a* is possible.

The motor housing 100 is configured so that the cooling medium circulates therein. That is, the motor housing 100 is connected to an external cooling path, and thus the cooling medium may circulate.

This rotational structure of the rotation shaft 100*a* of the motor housing 100 and an external cooling medium circulation path for cooling medium circulation are well-known generally, and thus descriptions thereof are omitted.

The main portion 210 and the sub-portion 220 are mounted in the motor housing 100. The cooling device 230 and the power module 240 are mounted in the main portion 210 and the sub-portion 220, respectively.

In the instant case, the plurality of main portions 210 and the sub-portion 220 are configured to be connected to each other and form one housing. The electric component 212, the cooling device 230, and the power module 240 that are mounted are modularized through the main portion 210 and the sub-portion 220.

In a state where the cooling device 230 and the power module 240 are provided in the main portion 210 and the sub-portion 220, respectively, the main portion 210 and the sub-portion 220, when connected to each other, are positioned so that the external flank surfaces of the main portion 210 and the sub-portion 220 are matched to each other. Thus, the main portion 210 and the sub-portion 220 form an inverter housing 200.

That is, when the motor housing 100 is formed to a shape of a circle, the main portion 210 and the sub-portion 220 is also formed to a shape of a circle so that the external flank surfaces thereof are matched to an external flank surface of the motor housing 100 in a state where each of the main portions 210 and the sub-portion 220 are connected to each other. Thus, the motor housing 100 and the inverter housing 200, when assembled together, are possibly integrated into one piece.

Accordingly, a bracket is formed on the motor housing 100, and a bracket matched to the present bracket is also formed on each of the main portions 210 and the sub-portion 220. The bracket on the motor housing 100 and the bracket on the sub-portion 220 are fastened to each other, and thus the motor housing 100 and the inverter housing 200 may be combined with each other.

That is, the inverter housing 200 is combined with the top portion of the motor housing 100. Thus, the cooling medium circulating in the motor housing 100 may circulate through the cooling device 230 that forms the inverter housing 200. The motor housing 100 and the inverter housing 200 may be electrically connected to each other.

Accordingly, for electrical connection, bus bars D may be provided on the motor housing 100 and the inverter housing 200, respectively, to face each other.

According to an exemplary embodiment of the present disclosure, in the state where each of the main portions 210 and the sub-portion 220 are connected to each other, the cooling device 230 through which the cooling medium circulates is provided to the flank surface of each of the main portion 210 and the flank surface of the sub-portion 220, and the power module 240 is provided between each of the cooling devices 230.

That is, the power module 240 internally generates heat during operation, and the power module 240 is cooled by heat exchange with the cooling medium circulation through the cooling device 230. The power module 240 is arranged to be interposed between the cooling devices 230, and thus the present double-sided cooling improves the cooling performance of the power module 240.

A control board 250 and a cover 260 are mounted on the top portion of the inverter housing 200.

That is, the control board 250 for controlling the power module 240 is provided on the top portion of the inverter housing 200 and is electrically connected to the power module 240. The control board 250 is arranged to be accommodated on the tops of the main portion 210 and the sub-portion 220 and thus is easily connected to each power module 240. Furthermore, the present arrangement is advantageous in terms of layout.

Furthermore, the cover 260 is mounted on the top portion of the inverter housing 200 and covers the top portion of the main portion 210 and the top portion of the sub-portion 220. Thus, a foreign material is prevented from being introduced into the inverter housing 200, and the main portion 210 and the sub-portion 220 are stably supported. Furthermore, the cover 260 blocks electromagnetic waves generated from various electric components 212 mounted in the main portion 210 and the sub-portion 220 from propagating to the outside.

Accordingly, according to an exemplary embodiment of the present disclosure, the power module 240, the cooling device 230, and the electric component 212 that are integrally combined into one piece forms an inverter assembly, and the inverter assembly and a motor assembly are connected to each other. In the present manner, structural simplification becomes possible. The cooling performance is secured through water cooling.

According to an exemplary embodiment of the present disclosure, as illustrated in FIG. 3, FIG. 4, and FIG. 5, a mounting space 211 in which the electric component 212 is accommodated is formed inside the main portion 210. The main portion 210 is formed to a fan shape or a triangle shape. The different main portions 210 are circularly connected to each other or to the sub-portion 220.

In the present manner, each of the main portions 210 is formed to a fan shape or a triangle shape, and each of the main portions 210 and the sub-portion 220 are circularly connected to each other. Accordingly, the main portion 210 and the sub-portion 220, when connected to each other, have the shape of a cylinder, and the entire size of the main portion 210 and the sub-portion 220 is reduced. Thus, the main portion 210 and the sub-portion 220 may have a shape matched to a shape of the motor housing 100.

Furthermore, the mounting space 211 in which the electric component 212 is accommodated is formed inside the main portion 210. The electric component 212 here is a capacitor. The electric component 212 is accommodated in the mounting space 211 in the main portion 210, and thus the main portion 210 and the electric component 212 may be configured as one component. Furthermore, the power module 240 is provided between each of the main portions 210. The electric component 212 mounted in the main portion 210 and the power module 240 are easily connected to each other.

A cooling path 110 along which the cooling medium circulates is formed in the motor housing 100. A recess portion A is formed in the flank surfaces of the main portion 210 and the sub-portion 220. When the cooling device 230 is combined, the cooling medium on the cooling path 110 circulates along the recess portion A.

In the present manner, the cooling path 110 along which the cooling medium is introduced and discharged from and to the outside is formed in the motor housing 100, and the recess portion A along which the cooling medium circulates is formed in the flank surfaces of the main portion 210 and the sub-portion 220. Thus, when the inverter housing 200 which is made up of the main portion 210 and the sub-portion 220 is combined with the motor housing 100, the cooling path 110 in the motor housing 100 communicates with the recess portions A in the main portion 210 and the sub-portion 220, and thus the cooling medium circulates.

The recess portion A along which the cooling medium circulates is formed in the flank surfaces of the main portion 210 and the sub-portion 220 such which is cut inward therefrom. When the main portion 210 and the sub-portion 220 are combined with the motor housing 100, the recess portions A communicate with the cooling path 110 in the motor housing 100. Thus, the cooling medium circulating in the motor housing 100 circulates along each of the recess portions A in the main portion 210 and the sub-portion 220, and exchanges heat with the cooling device 230.

In the instant case, a plurality of cooling fins 231 may be formed on the cooling device 230 to improve the efficiency of exchanging heat with the cooling medium.

To the present end, as illustrated in FIGS. 4, 5, 11, and 12, the recess portion A is formed in the flank surfaces of the main portion 210 and the sub-portion 220, and an inlet hole A1 and an outlet hole A2 are formed in lower surfaces of the main portion 210 and the sub-portion 220 to pass through each of the recess portions A. The cooling medium is introduced through the inlet hole A1 and is discharged through the outlet hole A2.

In the present manner, the recess portion A is formed in the main portion 210 and the sub-portion 220 so that the cooling medium circulates along the recess portion A. The inlet hole A1 and the outlet hole A2 are formed in each of the recess portions A to pass through each of the recess portions A. Thus, the cooling path 110 for the cooling medium is connected to each of the inlet hole A1 and the outlet hole A2, and the cooling medium may circulate.

In the instant case, a sealing ring R is connected to each of the inlet hole A1 and the outlet hole A2 in the lower surfaces of the main portion 210 and the sub-portion 220. Thus, the cooling medium, while circulating, may be prevented from leaking out.

The circulation of the cooling medium along the recess portions A in each of the main portions 210 and the sub-portion 220 in the motor housing 100 is described in detail. As illustrated in FIGS. 6 to 10, the cooling path 110 includes an introduction path 111, a connection path 112, and a discharge path 113. The introduction path 111 is connected to one of the inlet holes A1 in the main portion 210 or the sub-portion 220, the connection path 112 connects the inlet hole A1 in one of the adjacent recess portions A and the outlet hole A2 in the other one thereof in the main portion 210 and the sub-portion 220. The discharge path 113 is connected to one of the outlet holes A2 in the main portion 210 or the sub-portion 220.

Of course, the cooling path 110 in the motor housing 100 may be configured to have a shape which is connected to the inlet hole A1 and the outlet hole A2 that are formed in each of the main portions 210 and the sub-portion 220. A problem with the present configuration is that a larger space is necessary to form each of the cooling paths 110.

Therefore, a cooling path 110 according to various exemplary embodiments of the present disclosure includes the introduction path 111 for supplying the cooling medium, the connection path 112 providing a connection so that the cooling medium circulates along the recess portions A in each of the main portions 210 and the sub-portion 220, and the discharge path 113 along which the cooling medium is discharged for recirculation.

Figure 7:
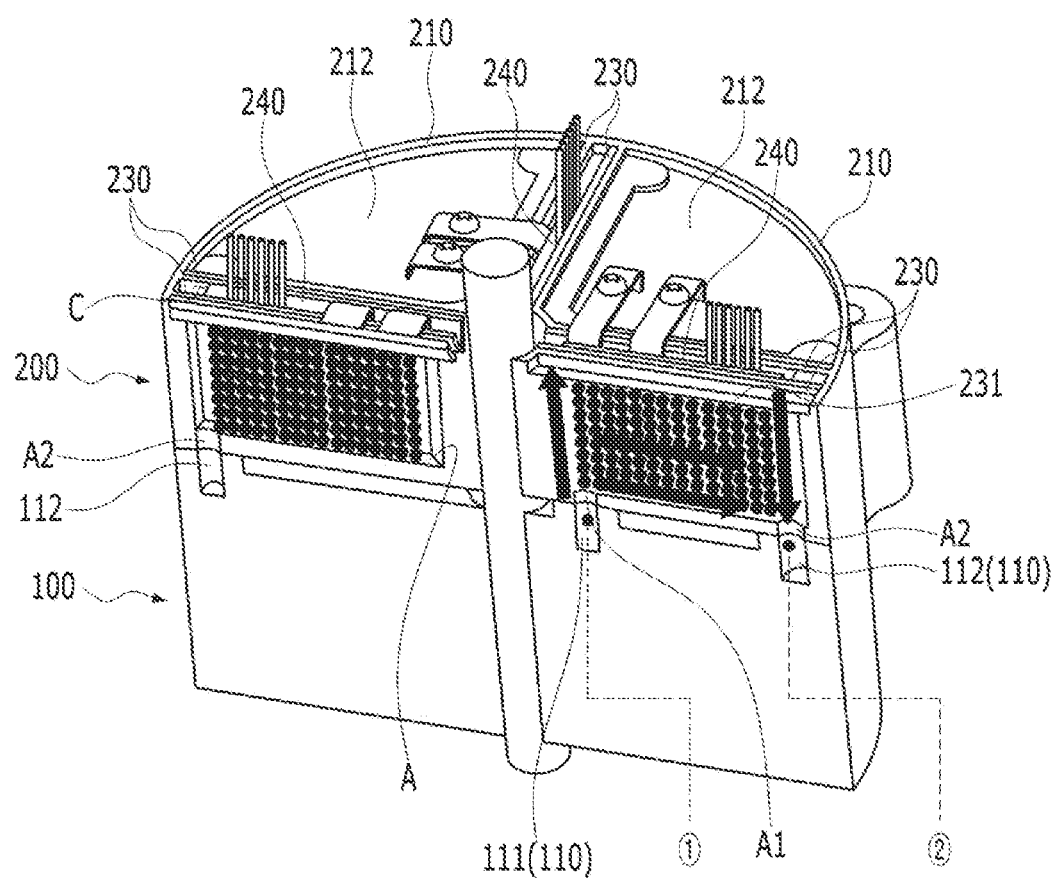
FIG. 7 is a cross-sectional perspective view exemplarily illustrating the inverter housing, taken along line A-A on FIG. 6.

As illustrated in FIG. 7, the cooling medium is introduced along the introduction path 111 in the motor housing 100 from the outside. The cooling medium circulates through the inlet hole A1 in the main portion 210 or the sub-portion 220 to which the introduction path 111 is connected.

Accordingly, the cooling medium circulates along the recess portion A through the inlet hole A1 to which the introduction path 111 is connected, exchanges heat with the cooling device 230, and then is discharged through the outlet hole A2 in the recess portion A.

Subsequently, as illustrated in FIG. 8, the recess portions A in the main portion 210 and the sub-portion 220 are connected to each other so that the cooling medium circulates through the connection path 112. That is, with reference to FIG. 8, first, the cooling medium circulating along the recess portion A in the sub-portion 220 is discharged through the outlet hole A2 in the recess portion A, flows through the connection path 112, and circulates through the inlet hole A1 formed in the recess portion A in the adjacent main portion 210.

In the present manner, the connection path 112 is connected to the inlet hole A1 in one of the adjacent recess portions A and the outlet hole A2 in the other one thereof in the main portion 210 and the sub-portion 220. Thus, the cooling medium may sequentially circulate along the recess portions A in each of the main portions 210 and the sub-portion 220.

In the present manner, the cooling medium sequentially circulating along the recess portions A is finally discharged through the discharge path 113 in the motor housing 100. Thus, the cooling medium may circulate through all the cooling devices 230.

That is, as illustrated in FIG. 9, the introduction path 111 in the motor housing 100 is connected to the inlet hole A1 formed in the recess portion A in the sub-portion 220. The present connection provides a circulation flow ① of the cooling medium. The cooling medium exchanges heat with the cooling device 230 mounted on the flank surface of the sub-portion 220 while circulating along the recess portion A in the sub-portion 220.

Subsequently, the outlet hole A2 formed in the recess portion A in the sub-portion 220 and the inlet hole A1 formed in the recess portion A in the main portion 210 adjacent to the recess portion A in the sub-portion 220 are connected to each other through the connection path 112. The present connection provides a circulation flow of the cooling medium from ② to ③. Subsequently, the cooling medium circulates along the recess portion in each of the main portions 210. That is, circulation flows ④ to ⑪ are provided. The outlet hole A2 in the recess portion A is connected to the discharge path 113 in the motor housing 100. The present connection provides a circulation flow ⑫ of the cooling medium. The cooling medium is discharged through the outlet hole A2.

In the present manner, the cooling medium exchanges heat with the cooling device 230 mounted in each of the recess portions P while circulating along the recess portions A in each of the main portions 210 and the sub-portion 220 through the introduction path 111 in the motor housing 100, the connection path 112, and the discharge path 113. Thus, the power module 240 is cooled by the cooling device 230.

As illustrated in FIGS. 5, 6, and 11, guide portions B are formed on the external flank surface of each of the main portions 210 and the external flank surface of the sub-portion 220, respectively, to extend in the same direction. Thus, when the main portion 210 and the sub-portion 220 are connected to each other, a separation space C is formed between each of main portions 210 and between the main portion 210 and the sub-portion 220. The cooling device 230 and the power module 240 are provided in the separation space C.

In the present manner, the guide portions B are formed on the external surface of each of the main portions 210 and the external surface of the sub-portion 220, respectively, in the same direction thereof. Accordingly, when each of the main portions 210 and the sub-portion 220 are connected to each other, each of the guide portions B has a structure that supports the adjacent main portion 210 or sub-portion 220. Thus, the separation space C is formed between each of the main portions 210 or between the main portion 210 and the sub-portion 220. The guide portions B may be formed on the external surfaces, respectively, of the main portion 210 and the sub-portion 220 to extend along the same line. Thus, the guide portions B extend to form the separation spaces C in which the cooling device 230 and the power module 240 may be provided.

As illustrated in FIGS. 2 and 13, an elastic mechanism 221 is provided in the sub-portion 220. The elastic mechanism 221 exerts an elastic force in a sideways direction thereof.

That is, the elastic mechanism 221 is provided in the sub-portion 220. The elastic mechanism 221, positioned between the main portion 210 and the sub-portion 220, provides the elastic force in a direction in which the main portion 210 and the sub-portion 220 are connected to each other. Thus, each of the power modules 240 is brought into contact with the cooling device 230 between each of the main portions 210 and the sub-portion 220.

Accordingly, the main portion 210 and the sub-portion 220 are pressed, by the elastic mechanism 221, in the direction in which the main portion 210 and the sub-portion 220 are connected to each other. Thus, the power module 240 and the cooling device 230 are brought into contact with each other, improving the cooling performance.

The elastic mechanism 221 includes a pair of variable panels 221a and an elastic body 221b. The pair of variable panels 221a is formed to be matched to the flank surface of the main portion 210 and the flank surface of the sub-portion 220 and is transformed so that a gap between the pair of variable panels 221a is widened in the sideways direction. The elastic body 221b is connected to the pair of variable panels 221a and exerts an elastic force in a direction in which the gap between the pair of variable panels 221a is widened.

In the present manner, the elastic mechanism 221 includes the pair of variable panels 221a and the elastic body 221b. The gap between the pair of variable panels 221a is widened by the elastic force of the elastic body 221b and thus presses the main portion 210 and the sub-portion 220 so that the main portion 210 and the sub-portion 220 are brought into contact with each other.

The pair of variable panels 221a here is configured so that end portions of the variable panels are connected to each other and is transformed so that the variable panels 221a rotate in opposite directions or in the same direction about the end portions thereof that are connected to each other. The elastic body 221b is connected to the variable panels 221a forming a pair. The gap between the pair of variable panels 221a is widened by the elastic force of the elastic body 221b. The elastic body 221b may be configured as a spring.

As illustrated in FIG. 2, when the power module 240 is not provided between each of the main portions 210 or between the main portion 210 and the sub-portion 220, a dummy portion 270 that has the same shape as the power module 240 is provided.

That is, a plurality of power modules 240 may be provided according to a specification which is required of an inverter. It is illustrated that three power modules 240 are provided.

When only two power modules 240 satisfy the specification which is required of the inverter, the dummy portion 270 is provided at a position which is not occupied by the power module 240 and is configured as a spacer. Accordingly, the dummy portion 270 may be formed in the same shape as the power module 240 and may be formed of a material, such as aluminum having a thermal conductivity.

Accordingly, the separation spaces C are all occupied by the power modules 240 and the dummy portion 270. Thus, respective positions of the main portions 210 and the sub-portion 220 are stably fixed, and the power module 240 and the cooling device 230 are brought into stable contact with each other. Accordingly, the cooling performance is also improved.

In the inverter-integrated motor apparatus with the structure as described, the power module 240, the cooling device 230, and the capacitor that are integrally combined into one piece forms the inverter assembly, and the inverter assembly and the motor assembly are connected to each other. In the present manner structural simplification becomes possible. Accordingly, the cooling performance is secured through the water cooling.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An inverter-integrated motor apparatus comprising:
a motor housing configured so that a cooling medium circulates therein;
a plurality of main portions mounted in the motor housing and connected to each other in a circumferential direction of the motor housing, electric components being accommodated in the plurality of main portions, respectively;
a sub-portion provided between each of the main portions and configured to press against an external flank surface of the main portion adjacent thereto;
a cooling device combined with a flank surface of each of the main portions and a flank surface of the sub-portion, the cooling medium in the motor housing being shared with the cooling device and circulating through the cooling device; and
a power module positioned between each of the main portions or between the main portion and the sub-portion and interposed between each of cooling devices.

2. The inverter-integrated motor apparatus of claim 1, wherein, in a state where the cooling device and the power module are provided in the main portion and the sub-portion, respectively, the main portion and the sub-portion, when connected to each other, are positioned so that the external flank surfaces of the main portion and the sub-portion are matched to each other, and thus forms an inverter housing.

3. The inverter-integrated motor apparatus of claim 2, wherein the inverter housing is mounted on a top portion of the motor housing and is electrically connected thereto, and a control board and a cover are mounted on a top portion of the inverter housing.

4. The inverter-integrated motor apparatus of claim 1, wherein a mounting space in which the electric component is accommodated is formed inside the main portion which is formed to a fan shape or a triangle shape and to which another main portion or the sub-portion is circularly connected.

5. The inverter-integrated motor apparatus of claim 1, wherein a cooling path along which the cooling medium circulates is formed in the motor housing, and
wherein a recess portion along which the cooling medium on the cooling path circulates when the cooling device is combined is formed in the flank surfaces of the main portion and the sub-portion.

6. The inverter-integrated motor apparatus of claim 5, wherein an inlet hole through which the cooling medium is introduced and an outlet hole through which the cooling medium is discharged are formed in the recess portion of each of the main portion and the sub-portion.

7. The inverter-integrated motor apparatus of claim 6, wherein the cooling path includes:
an introduction path connected to one of the inlet holes in the main portion or the sub-portion;
a connection path connecting the inlet hole in one of the adjacent recess portions and the outlet hole in the other one thereof in the main portion and the sub-portion; and
a discharge path connected to one of the outlet holes in the main portion or the sub-portion.

8. The inverter-integrated motor apparatus of claim 1, wherein guide portions are formed on the external flank surface of each of the main portions and the external flank surface of the sub-portion, respectively, to extend in a same direction, and when the main portion and the sub-portion are connected to each other, a separation space is formed between each of the main portions and between the main portion and the sub-portion so that the cooling device and the power module are provided in the separation space.

9. The inverter-integrated motor apparatus of claim 8, wherein when each of the main portions and the sub-portion are connected to each other, each of the guide portions supports the adjacent main portion or sub-portion so that the separation space is formed between each of the main portions or between the main portion and the sub-portion.

10. The inverter-integrated motor apparatus of claim 1, wherein an elastic mechanism that exerts an elastic force in a sideways direction is provided in the sub-portion.

11. The inverter-integrated motor apparatus of claim 10, wherein the elastic mechanism includes:
a pair of variable panels formed to be matched to the flank surface of the main portion and the flank surface of the sub-portion and transformed so that a gap between the pair of variable panels is widened in a sideways direction thereof; and
an elastic body connected to the pair of variable panels and configured to exert an elastic force in a direction in which the gap between the pair of variable panels is widened.

12. The inverter-integrated motor apparatus of claim 1, wherein, when the power module is not provided between each of the main portions or between the main portion and the sub-portion, a dummy portion having a same shape as the power module is provided.

* * * * *